(No Model.) 2 Sheets—Sheet 1.

E. H. P. TAYLOR.
BICYCLE GEAR.

No. 501,381. Patented July 11, 1893.

WITNESSES:
Donn Twitchell
C. Sedgwick

INVENTOR
E. H. P. Taylor
BY Munn & Co
ATTORNEYS.

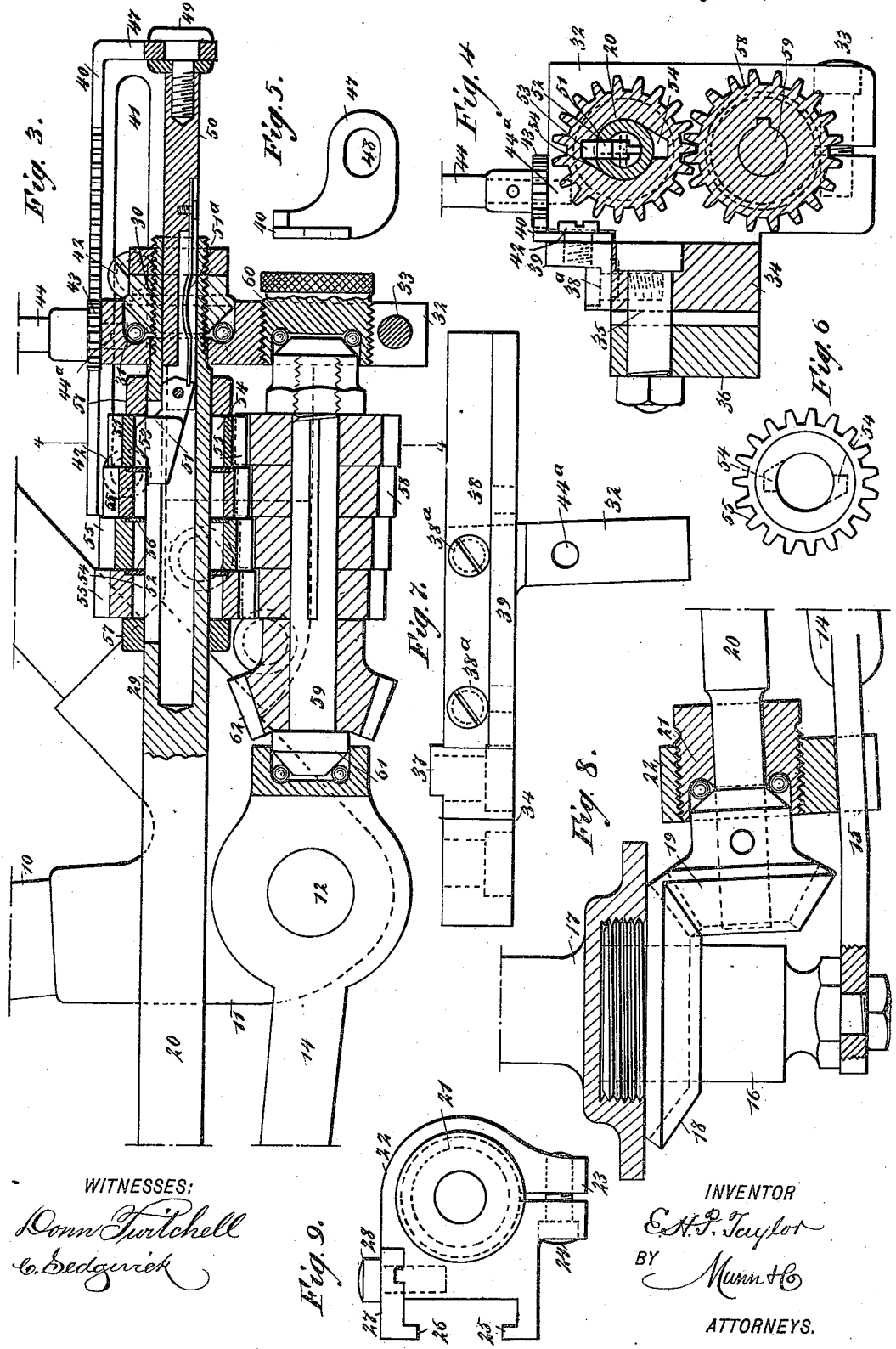
(No Model.) 2 Sheets—Sheet 2.
E. H. P. TAYLOR.
BICYCLE GEAR.
No. 501,381. Patented July 11, 1893.
WITNESSES:
Donn Twitchell
C. Sedgwick
INVENTOR
E. H. P. Taylor
BY
Munn & Co.
ATTORNEYS.

UNITED STATES PATENT OFFICE.

ERNEST H. P. TAYLOR, OF WATERBURY, CONNECTICUT.

BICYCLE-GEAR.

SPECIFICATION forming part of Letters Patent No. 501,381, dated July 11, 1893.

Application filed January 14, 1893. Serial No. 458,337. (No model.)

*To all whom it may concern:*

Be it known that I, ERNEST H. P. TAYLOR, of Waterbury, in the county of New Haven and State of Connecticut, have invented a new and Improved Bicycle-Gear, of which the following is a full, clear, and exact description.

My invention relates to improvements in bicycle gears; and the object of my invention is to produce a differential gear which may be applied conveniently to any ordinary safety bicycle, and dispense with the ordinary sprocket and chain; which may be made very light and strong, and which may be quickly and easily adjusted so as to change the gearing in a way to drive the bicycle fast or slow as desired.

To this end my invention consists in certain features of construction and combinations of parts, as will be hereinafter described and claimed.

Reference is to be had to the accompanying drawings forming a part of this specification, in which similar figures of reference indicate corresponding parts in all the views.

Figure 1:
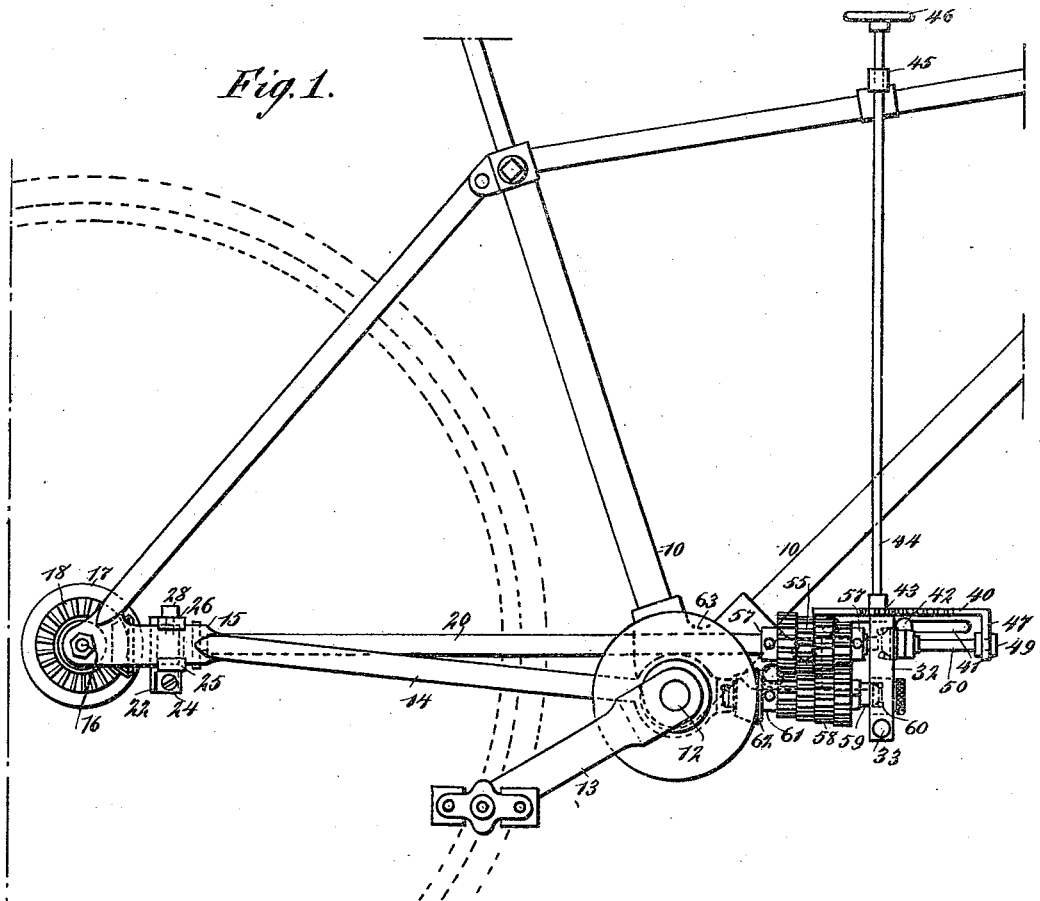
Figure 2:
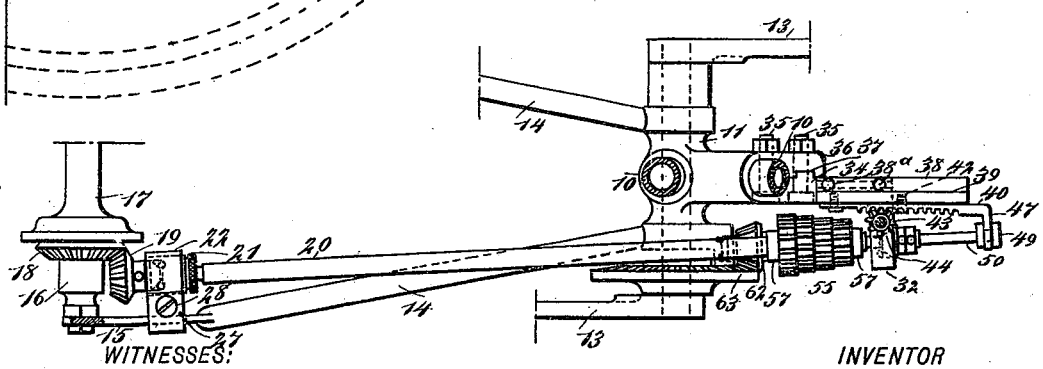

Figure 1 is a broken side elevation of the gearing showing its application to the machine. Fig. 2 is a plan view of the gear mechanism, showing a portion of the frame. Fig. 3 is an enlarged detail longitudinal section of the shifting mechanism for changing the speed. Fig. 4 is a cross section on the line 4—4 in Fig. 3. Fig. 5 is a detail end view of a shifting rack. Fig. 6 is an end view of one of the loose gears arranged on the driving shaft. Fig. 7 is a plan view of the hanger and rack support which are secured to the lower front portion of the main frame. Fig. 8 is a detail sectional plan illustrating the manner in which the rear end of the driving shaft connects with the hub of the rear bicycle wheel; and Fig. 9 is an end view of the supporting clamp for the rear end of the driving shaft.

The machine frame 10 is the ordinary diamond frame which connects the front and rear wheel of the bicycle, and which, at its lower extremity at a point midway between the two wheels, is formed into a journal 11 for the crank shaft 12, the latter being driven by the usual pedal cranks 13. Extending rearward from the journal 11 are the lower side pieces 14 of the frame which, in this case, are preferably flattened at their rear ends, as shown at 15, and these rear ends are fastened to the spindles 16 which are rigid with and project from the rear hub 17 in the usual manner. On the end of the hub 17 is a bevel gear wheel 18 meshing with a pinion 19 on the driving shaft 20 which shaft extends horizontally forward above the crank shaft 12 to which it is connected by a differential gearing to be hereinafter described. The rear end of the shaft 20 is supported in a ball bearing 21, formed in a bearing block or clamp block 22 which is split on the under side, as shown at 23, and its opposite parts adjusted with reference to each other by a bolt 24. On the outer side of the bearing block 22 are lugs 25 and 26 which are adapted to clamp the flattened portion 15 of one of the arms 14, and to enable this to be done, the lug 26 is formed on a detachable plate 27 which is secured to the upper portion of the block by a bolt or set screw 28. The front end of the shaft 20 is hollow, as shown at 29 in Fig. 3, and its forward extremity 30 is reduced and journaled in a ball bearing 31, as shown in the same figure. This bearing is supported in a split hanger 32, the parts of which are held together and adjusted by a bolt 33, see Fig. 4, and this hanger is formed on a plate 34 which is fastened by bolts 35 to an extension 36 which projects forward from the journal 11, as best shown in Fig. 2. The plate 34 is provided on its inner side with a lip 37 which fits a corresponding recess in the extension 36 and this strengthens the joint. Secured to the top of the plate 34 is a second extension 38 which projects forward and is fastened firmly in place by bolts 38ª, as shown best in Figs. 2 and 7. The extension plate 38 has an upturned flange 39 thereon to which is bolted a sliding rack 40, the latter being slotted longitudinally, as shown at 41, and held in place by bolts 42 which project through the slot and into the plate 38 and on which the rack slides. The rack 40 is engaged and actuated by a pinion 43 on the lower end of a shaft 44 which is stepped in a socket 44ª in the top of the hanger 32 and which extends upward on the side of the frame 10 to a point where it may be easily reached from the saddle of the machine. Its upper portion is supported in a keeper 45 and it terminates in a handle or wheel 46 by which it may be revolved. It will be seen that the turning of the shaft 44 will cause the rack 40 to be moved forward or backward. The front end of the rack 40 is bent at an angle, as shown clearly at 47 in Fig. 3, and this bent end is perforated, as at 48, and held on the head of a screw 49 which screws into the end of a rod 50, and the latter is held to slide longitudinally in the bore 29 of the driving shaft 20. On the inner end of this rod 50 is a latch 51 which is pivoted on the rod and is firmly pressed outward by a spring 51ª which is secured to the rod and the latch. The latch slides in a slot 52 in the end of the shaft 20 and is provided on its outer side with a boss 53 having its end edges oppositely inclined, and this boss is adapted to enter recesses 54 in the gear wheels 55 which are journaled loosely on the shaft 20 and are held in place between collars 57 on the shaft. The gear wheels are provided at one end with a face plate 56 which prevents the latch from being accidentally shifted so as to cause two wheels to turn at the same time, but when the rod 50 is intentionally moved, the inclined edges of the boss 53 will slide over the face plates, the spring 51ª yielding sufficiently to permit the above movement to be accomplished. It will be seen that when the gear wheel 55, which is in engagement with the latch 51, is revolved, the shaft 20 will also revolve and the movement will be transmitted to the rear bicycle wheel through the gearing on the rear end of the shaft 20. It will be noticed that the series of gears 55 form practically a cone gear, although the gears are independent of each other. These gears mesh with a cone gear 58 on a short shaft 59 which is arranged parallel with the shaft 20 and is supported in ball bearings 60 and 61 arranged respectively in the hanger 32 and the flattened portion of the frame 10. The largest portion of the cone gear 58 meshes with the smallest of the gears 55, and the smallest portion of the cone gear meshes with the largest of the gears 55, the intermediate portions of the cone meshing with the intermediate gears, and consequently any desired speed within the limits of the gearing may be maintained, as hereinafter described. It will be seen that when the largest portion of the cone gear meshes with the smallest of the gears 55, the latter gear and the shaft 20, if connected with said gear, will be rapidly revolved, but with comparatively little power, while if the largest of the gears 55 is connected with the shaft and driven by the cone gear, a low speed and great power will result. On the rear end of the cone gear is formed a bevel pinion 62 which meshes with a pinion 63 on the pedal shaft 12, and consequently the movement of the pedal shaft is transmitted through the cone gear to the gears 55 from one of these to the driving shaft 20 and from the latter to the rear bicycle wheel.

The machine is operated in the usual way, except for shifting the speed of the gearing, and to do this the shaft 44 is turned so as to slide the rack 40 and bring the latch 51 into engagement with the desired gear 55. In this way the speed of the machine may be very nicely regulated to suit the strength and weight of the rider and the character of the country over which he is riding.

From the foregoing description, it will be readily seen that the attachments described may be easily applied to any ordinary bicycle frame with very slight modifications of the latter.

Having thus described my invention, I claim as new and desire to secure by Letters Patent—

1. In a bicycle the combination with the treadle shaft having a gear wheel and a longitudinally extending drive shaft 20 geared at its rear end to the rear wheel extending at its forward tubular slotted end across the treadle shaft and provided with a series of loose gears 55, having recesses 54, of a longitudinally sliding bar 50 extending into said tubular slotted end and carrying a latch 51 having a nose 53 extending through said slot to lock any one of the loose gears to their shaft, a rack parallel with the shaft 20 and having a lateral extension at its forward end secured loosely to the forward end of the sliding rod to permit said rod to rotate while the rack remains stationary, a hand operated shaft geared at its lower end to the rack and the cone gear 58 meshing with the loose gears and provided at its inner end with a gear 62 meshing into the treadle shaft gear, substantially as set forth.

2. The combination, with the drive shaft having a tubular slotted end and a series of loose gears and the cone gear meshing into the said gears and geared to its operating shaft, of a rod sliding in the tubular shaft, a latch 51 pivoted to the inner end of the shaft and having a nose 53 extending through said slot to lock any one of the loose gears to its shaft, a longitudinally extending spring 51ª secured at its outer end to the sliding rod and at its inner end secured to the heel of the latch below its pivot to throw the said nose out through the slot and a rack and pinion for sliding the rod, the said rack being parallel with and loosely connected to the said rod whereby the rod will be free to rotate while the rack remains stationary substantially as set forth.

3. In a bicycle, the combination with the rear wheel gear 18, the bearing block 22 clipped to the frame adjacent to said gear, the forward bearing block 32 secured to the frame in front of the treadle shaft, the longitudinally extending shaft 20 journaled in said blocks 22, 32 geared at its rear end to the gear 18 and having a tubular slotted forward end, a series of loose gears on said slotted end, a cone gear meshing with said loose gears and the shaft of which is journaled at its forward end in the block 32 and at its rear end in a bearing adjacent to the treadle shaft the gear 62 meshing with the treadle shaft gear, the extension 38 secured to the plate 34 of block or hanger 32 and having an upturned flange 39, a slotted rack bolted to and sliding on said flange, a sliding rod 50 parallel with the rod and secured to its outer end, a latch 51 pivoted to the inner end of the rod and having a nose 53 projecting through the slot in the shaft 20 to lock any one of the loose gears thereto, and the shaft 44 geared at its lower end to the rack, substantially as set forth.

ERNEST H. P. TAYLOR.

Witnesses:
 JOHN B. RIGGS,
 ALONZO E. BINGHAM.